United States Patent
Cradduck

Patent Number: 5,855,044
Date of Patent: Jan. 5, 1999

[54] HOSE CLAMP WITH CLAW

[75] Inventor: Kevin M. Cradduck, Christiana, Tenn.

[73] Assignee: ACD Tridon Inc., Burlington, Canada

[21] Appl. No.: 910,079

[22] Filed: Aug. 12, 1997

[51] Int. Cl.[6] .............................. B65D 63/02; F16L 33/20
[52] U.S. Cl. ................................. 24/20 R; 24/19; 24/20S
[58] Field of Search ...................... 24/19, 20 R, 20 CW, 24/20 EE, 20 S, 23 R

[56] References Cited

U.S. PATENT DOCUMENTS

| 4,099,298 | 7/1978 | Gimenez | 24/27 |
|---|---|---|---|
| 4,305,179 | 12/1981 | Sakurada | 24/20 R |
| 4,380,096 | 4/1983 | Nishida et al. | 24/20 R |
| 4,425,681 | 1/1984 | Ilius | 24/20 S |
| 4,713,863 | 12/1987 | Jennings | 24/20 R |
| 4,773,129 | 9/1988 | Muhr | 24/20 R |
| 4,858,279 | 8/1989 | Kato et al. | 24/20 R |
| 4,930,192 | 6/1990 | Muhr | 24/20 R |
| 4,996,749 | 3/1991 | Takahashi | 24/20 R |
| 5,145,218 | 9/1992 | Worley et al. | 24/19 X |
| 5,185,907 | 2/1993 | Kawashima et al. | 24/20 R |
| 5,234,233 | 8/1993 | Fix | 285/23 |
| 5,377,389 | 1/1995 | Calmettes et al. | 24/20 R |
| 5,414,905 | 5/1995 | Kimura et al. | 24/20 R |
| 5,596,790 | 1/1997 | Möller | 24/20 S X |

FOREIGN PATENT DOCUMENTS

| 3543717 | 6/1987 | Germany . |
|---|---|---|
| 4312846 | 4/1994 | Germany . |
| 4305649 | 9/1994 | Germany . |
| 4441439 | 5/1996 | Germany . |

Primary Examiner—Anthony Knight
Assistant Examiner—Robert J. Sandy
Attorney, Agent, or Firm—Rogers & Scott

[57] ABSTRACT

A clamping device is provided for use in applying radial compressive loading on a deformable tube to retain the tube on a fixed tubular element. The device includes a central portion and first and second interengaged end portions with the first end portion having parallel side pieces and a pair of outwardly extending legs dependent one from each of the side pieces. The legs are spaced apart and a bridge extends between the legs outwardly of the legs. The second end portion has a central piece extending between the legs of the first end portion and including a radial projection extending outwardly from the end of the central piece and defining an outwardly facing step. A claw is integrally attached to one of the legs and extends generally in parallel with the side pieces and a tooth on the claw projects radially inwards for engagement over the step on the radial projection to hold the clamp in an expanded prestressed position ready for release by dislodging the tooth radially outwards relative to the radial projection so that energy stored in the clamp is then available to cause the clamp to embrace the tube in a deployed position to apply the radial compressive stress to the tube.

7 Claims, 2 Drawing Sheets

HOSE CLAMP WITH CLAW

FIELD OF THE INVENTION

This invention relates to a clamping device of the type commonly referred to as a "hose clamp". Such devices are used to secure a deformable tube on rigid cylindrical fittings such as those found in automobile engines. The device is usually supplied in an expanded pre-stressed condition ready to be activated in use to embrace the tube and thereby apply a radial compressive force on the tube.

BACKGROUND OF THE INVENTION

Hose clamps have been designed in a great variety of forms which fall into three general types. A first of these types is a continuous band which includes an upstanding portion or "ear" which can be deformed permanently after assembly to tension the band around a hose. Such clamps are sometimes referred to as Oetiker clamps after the name of the inventor.

A second type of clamp includes a mechanical actuator, such as a worm screw, acting directly on a band to bring the band into firm engagement with the hose. Lastly, the third type is a clamp of spring steel made to have a diameter slightly less than that of the outside diameter of the hose, so that when the clamp is deformed and positioned on the hose, there will be stored energy in the clamp to apply a compressive radial force to hold the clamp on the hose. The present invention provides a clamp of the third type.

Clamps of the present type are first enlarged at the point of manufacture and retained in this condition either by mechanical interference between ends of the clamp or by a separate keeper in the form of a clip which is added to hold the clamp in the enlarged prestressed condition.

Clamps which use clips suffer from the possibility that energy stored in the clamp will propel the clip and cause it to be lost. This problem is exacerbated when used in automobiles because the clip could become lodged anywhere in the engine compartment.

By contrast those clamps which rely on inter-engagement of the ends to hold the clamp open are not always easy to release because of the problems of accessibility and the need for special tools.

Accordingly, it is an object of the present invention to provide a clamping device which can be delivered in a prestressed condition and which can be released easily using standard tools to facilitate placement on a deformable tube to create radial compressive stress in the tube.

SUMMARY OF THE INVENTION

A clamping device is provided for use in applying radial compressive loading on a deformable tube to retain the tube on a fixed tubular element. The device includes a central portion and first and second interengaged end portions with the first end portion includes parallel side pieces and a pair of outwardly extending legs dependent one from each of the side pieces. The legs are spaced apart and a bridge extends between the legs and outwardly of the legs. The second end portion has a central piece extending between the legs of the end portion and including a radial projection extending outwardly from the end of the central piece and defining an outwardly facing step. A claw is integrally attached to one of the legs and extends generally in parallel with side pieces and a tooth on the claw projects radially inwards for engagement over the step on the radial projection to hold the clamp in an expanded prestressed position ready for release by dislodging the tooth radially outward realative to the step on the radial projection so that energy stored in the clamp is then available to cause the clamp to embrace the tube in a deployed position to apply the radial compressive stress to the tube.

BRIEF DESCRIPTION OF THE DRAWINGS

The invention will be better understood with reference to the following description taken in combination with the drawings, in which.

DESCRIPTION OF THE PREFERRED EMBODIMENT

Figure 1:
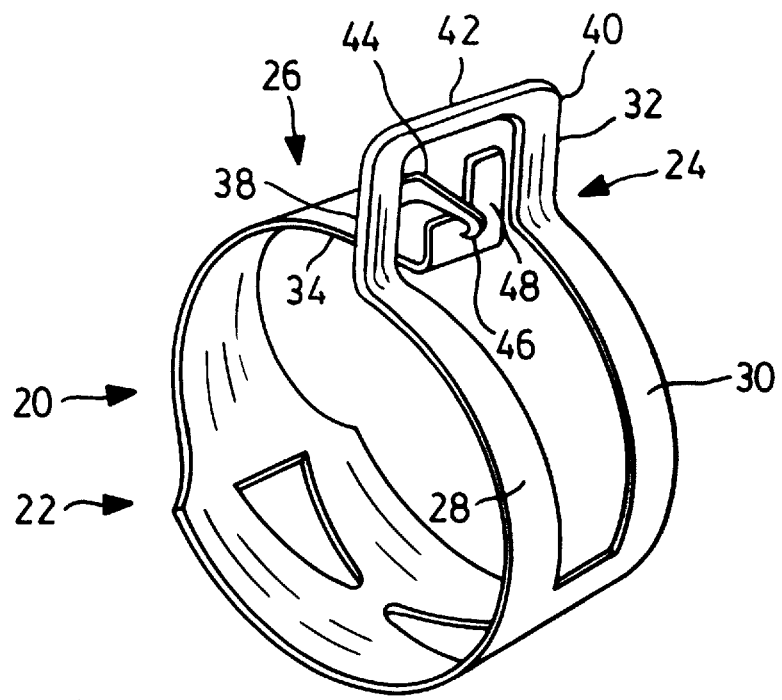
FIG. 1 is an isometric view of a generally cylindrical clamping device according to the invention and in the form of an exemplary hose clamp which incorporates a preferred embodiment of the invention shown in an expanded condition ready to be placed on a hose.

Reference is first made to FIG. 1 which illustrates a clamping device designated generally by the numeral 20. The clamping device is essentially a steel strap formed into a generally cylindrical open ring having ends which are resiliently interengaged to hold the clamp in an expanded condition. The clamp consists essentially of a central portion 22, a first end portion 24, and a second end portion 26.

The first end portion 24 includes a pair of spaced apart side pieces 28, 30 which are in a coplanar arrangement and which terminate at a first end piece 32. The first end portion 24 is interengaged with second end portion 26 by virtue of a central piece 34 which is proportioned to fit loosely between the side pieces 28, 30 as will become evident from further description.

The first end piece 32 includes radially projecting legs 38, 40 which depend from respective side pieces 28, 30 and which meet at their outward extremities at a bridge 42 located at an end of the first end portion 24. The bridge locates the legs 38, 40 and hence maintains the relationship of the side pieces 28, 30.

The leg 38 has an integral claw 44 attached to it and bent out of the plane of the legs 38, 40 and bridge 42 to extend circumferentially in a direction generally parallel to the side pieces 28, 30. The claw lies in a radial plane and includes a radially extending tooth 46 in the same plane and projecting towards the axis of the circular clamp for reasons which will be more fully explained later. However, it will be evident from FIG. 1 that the tooth is engaged over a radially and outwardly extending stepped projection 48 of a second end piece 36. The projection can be better seen in FIG. 2 where it will be seen that there is a step 50 and that the projection extends outwardly beyond the step to form an extension 52.

Figure 2:
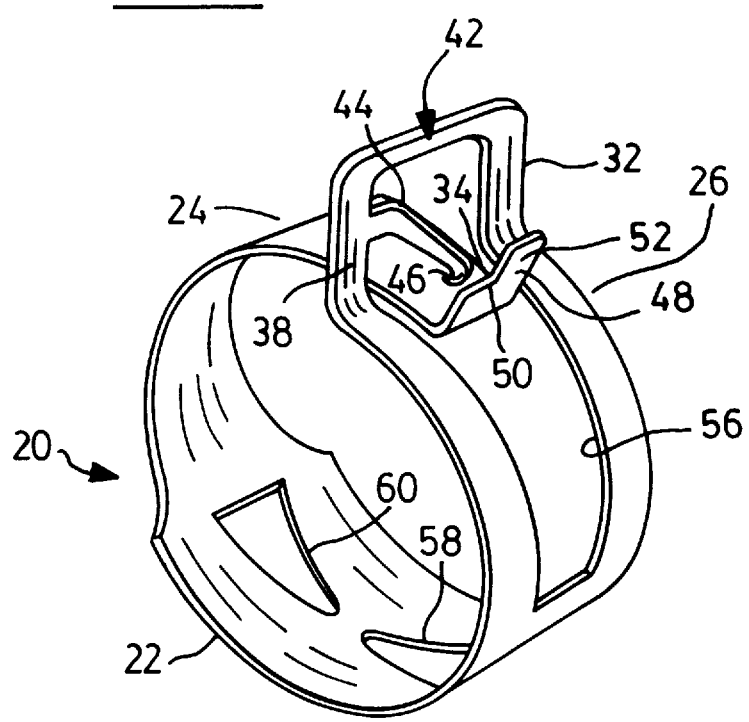
FIG. 2 is a view similar to FIG. 1 after the clamp has been released to allow the clamp to move into a clamping condition urged by the stored energy in the clamp.

It will be evident that the clamp 20 can be released to move from the expanded condition shown in FIG. 1 to the relaxed or deployed position shown in FIG. 2 by dislodging the claw 44 from the step 50. This is achieved in any suitable manner but because of the structure of this clamp, it is convenient to use a simple tool such as a flat screwdriver.

Figure 3:
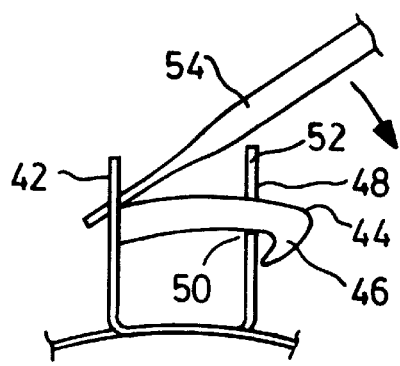
FIG. 3 is a side view of a portion of the clamp drawn to a larger scale to illustrate how the clamp is released using a flat-ended screwdriver.

Reference is made to FIG. 3 to illustrate how a flat screwdriver can be used to deploy the clamp. As seen in this figure (which is drawn to a larger scale than that used in FIG. 1), a screwdriver 54 is engaged under the bridge 42 and positioned to bear down on an outward extremity of the extension 52 of projection 48. A downward force applied on the screwdriver will cause the bridge to be pulled radially outwards while at the same time pushing the projection 48 radially inwards. Because the projection and bridge are separate ends of the clamp, there is sufficient radial resilience for the projection 48 and bridge to be dislodged relative to one another in a radial direction. As a result, the tooth 46 on the end of the claw 44 will be released from the step 50 and the energy stored in the clamp will be available to move the clamp from the prestressed or expanded condition shown in FIG. 1 into the position shown in FIG. 2.

The arrangement of the structure is such that a number of different tools could be used to release the clamp and it is even possible to apply a sudden load to the end of the projection 48 to dislodge it radially inwardly and to release the tooth 46 from the step 50. In general, the claw is simply positioned on the step 46 and is free to be dislodged in any way that is suitable. It is not located by engagement with anything but the step and it could be dislodged by causing relative axial movement between the first and second end portions 24, 26 so that the tooth 46 would slide off the side of the step 50 rather than off the radial outward extremity of the step. All such approaches are within the scope of the utility of the clamp.

Figure 4:
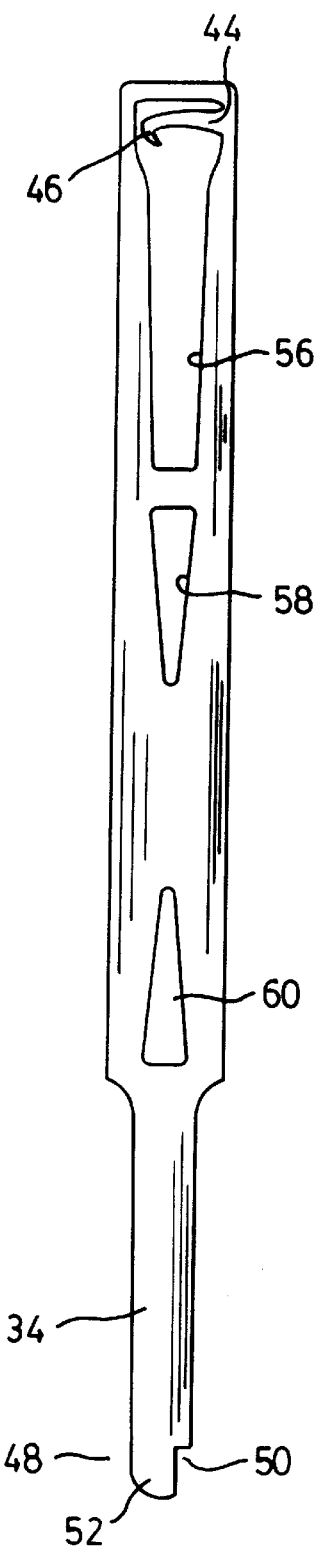
FIG. 4 is a view of a stamped blank used to make the clamp.

Reference is next made to FIG. 4 which illustrates a typical stamping made from strip steel exhibiting the necessary strength and resilience and used to make a clamp according to the invention. Previous drawings have been proportioned to best illustrate the invention and FIG. 4 illustrates a practical shape and size capable of making a clamp. It will be seen that a major advantage of this design of clamp is that the claw 44 can be stamped from the material along with openings 56, 58, and 60. Also, the initial strip used to make the blank shown in FIG. 4 is the normal width of the body and consequently the central piece 34 must be created by removing material to either side of it while at the same time creating the step 50 and extension 52 of the projection 48. There is a further advantage to this and that is that the process allows good definition of the tooth 46 because it is created purely by stamping and does not require any bending process.

The clamp is made by standard techniques used to convert a blank such as that shown in FIG. 4 into a round generally cylindrical clamp such as that shown in FIG. 1. Also, during the forming process the claw 44 is bent out of alignment with the remainder of the clamp so that it extends at right angles to a plane containing the legs 38, 40 and bridge 42.

A significant aspect of this invention is that the central piece 34 of the second end portion 26 is engaged between the side pieces 28, 30 of the end portion 24 for better stability while transporting the clamp in the expanded pre-stressed condition. In order to do this, the claw 44 must extend from the end piece 32 to run generally parallel with the side pieces 28, 30. This puts the claw in tension and it is important that the claw be well defined to provide clean and effective contact with the projection 48. As mentioned, this is achieved by stamping the blank to define the tooth 46 rather than by a bending process which would not create the same definition. Consequently, the clamp provides a relatively stable arrangement which can be dislodged using simple tooling because the full bridge 42 is available for engagement by a screwdriver.

Modifications to the structure of the clamp can be made consistent with maintaining a stamped tooth at the end of the claw for better definition of the tooth to improve engagement on the projection 46. Also, it will be evident to those skilled in the art that the form of the clamp can be modified without departing from the invention as described and claimed.

I claim:

1. A clamping device for use in applying radial compressive loading on a deformable tube to retain the tube on a fixed tubular element, the device being resilient and generally cylindrical and comprising:

a central portion and first and second interengaged end portions;

the first end portion including parallel side pieces and a pair of outwardly extending legs dependent one from each of the side pieces, the legs being spaced apart and a bridge extending between the legs and spaced outwardly of the legs;

the second end portion including a central piece having a radial projection extending outwardly from the end of the central piece and terminating at an outwardly facing step, said central piece being between the legs; and a claw integrally attached to one of said legs and extending generally in parallel with said parallel side pieces, the claw including a tooth extending radially inwards so that the clamp can be retained in an expanded pre-stressed condition by opening the clamp to cause the tooth to ride over the step to engage the tooth against the radial projection whereby the clamp can be released by dislodging the tooth radially outwards and off the radial projection so that energy stored in the clamp is then available to separate the tooth and the projection and thereby move the clamp into a deployed position to apply radial compressive loading to the tube.

2. A clamping device as claimed in claim 1 in which the radial projection further includes an extension projecting radially outwards beyond the step and having an outward extremity so that a user can insert a screwdriver under the bridge and on said outward extremity to apply a radially inward force on the extension to cause said release of the tooth off the radial projection.

3. A clamping device for use in applying a compressive radial force on a deformable tube, the device being of strip steel and generally cylindrical, the device having:

a central portion and first and second end portions;

the first end portion having an end piece extending radially outwards and a claw which is an integral part of the end piece and bent out of the plane of the end piece, the claw defining a tooth in the plane of the claw and extending radially inwards; and the second end portion having an outwardly extending radial projection defining a step, the claw being engaged on the step in a radial direction with the clamping device in an expanded pre-stressed condition ready for deployment by dislodging the claw radially away from the step to permit the clamping device to use the energy stored in the clamping device to embrace the tube and thereby apply the compressive radial force on the deformable tube.

4. A clamping device as claimed in claim 3 in which said end piece includes a pair of radially extending legs and a bridge between the legs, the bridge being radially outwards of the legs.

5. A clamping device as claimed in claim 4 in which the claw is bent out of a plane containing the legs.

6. A clamping device as claimed in claim 5 in which the claw is integrally attached to one of the legs.

7. A clamping device as claimed in claim 6 in which said radial projection further includes an extension which extends outwardly beyond the step and is available to apply an inwardly directed radial force to dislodge the claw radially off the step thereby releasing the device.

* * * * *